US012538375B2

(12) United States Patent
Cheng et al.

(10) Patent No.: US 12,538,375 B2
(45) Date of Patent: Jan. 27, 2026

(54) RRC RE-ESTABLISHMENT AND RADIO LINK FAILURE REPORTING IN SIDELINK RELAY SYSTEMS

(71) Applicant: QUALCOMM Incorporated, San Diego, CA (US)

(72) Inventors: Peng Cheng, Beijing (CN); Karthika Paladugu, San Diego, CA (US); Gavin Bernard Horn, La Jolla, CA (US); Huichun Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 18/006,365

(22) PCT Filed: Aug. 17, 2020

(86) PCT No.: PCT/CN2020/109517
§ 371 (c)(1),
(2) Date: Jan. 20, 2023

(87) PCT Pub. No.: WO2022/036501
PCT Pub. Date: Feb. 24, 2022

(65) Prior Publication Data
US 2023/0269809 A1    Aug. 24, 2023

(51) Int. Cl.
*H04W 76/19* (2018.01)
*H04W 88/04* (2009.01)

(52) U.S. Cl.
CPC ............ *H04W 76/19* (2018.02); *H04W 88/04* (2013.01)

(58) Field of Classification Search
None
See application file for complete search history.

(56) References Cited

U.S. PATENT DOCUMENTS

| 2011/0250892 | A1 | 10/2011 | Gupta et al. |
| 2015/0365994 | A1 | 12/2015 | Yu et al. |
| 2017/0071028 | A1 | 3/2017 | Kuo et al. |
| 2019/0289520 | A1* | 9/2019 | Xu ..................... H04W 36/033 |
| 2020/0029384 | A1 | 1/2020 | Hong et al. |

(Continued)

FOREIGN PATENT DOCUMENTS

| CN | 107535012 A | 1/2018 |
| CN | 107710862 A | 2/2018 |

(Continued)

OTHER PUBLICATIONS

Supplementary European Search Report—EP20949714—Search Authority—Berlin—Apr. 2, 2024.

(Continued)

*Primary Examiner* — Mewale A Ambaye
(74) *Attorney, Agent, or Firm* — Patterson & Sheridan, L.L.P/Qualcomm Incorporated

(57) ABSTRACT

Certain aspects of the present disclosure provide techniques for RRC connection reestablishment by a remote UE. In some cases, a remote UE may be configured to detect, on at least one of a first link between a first relay UE and a first network entity or a second link between the remote UE and the first relay UE, a radio link failure (RLF) resulting in a loss of radio resource control (RRC) connection and attempt to reestablish RRC connection by performing at least one of relay selection or cell selection.

40 Claims, 19 Drawing Sheets

(56) References Cited

U.S. PATENT DOCUMENTS

| | | | |
|---|---|---|---|
| 2020/0068580 A1 | 2/2020 | Tang et al. | |
| 2020/0267762 A1* | 8/2020 | Lee | H04W 80/02 |
| 2020/0267796 A1* | 8/2020 | Lee | H04W 76/19 |
| 2022/0322173 A1* | 10/2022 | Chang | H04W 36/305 |
| 2023/0164866 A1* | 5/2023 | Chang | H04W 76/20 |
| | | | 370/329 |
| 2023/0262817 A1* | 8/2023 | Yu | H04W 76/19 |
| | | | 370/329 |
| 2023/0337310 A1* | 10/2023 | Wu | H04W 72/231 |

FOREIGN PATENT DOCUMENTS

| | | | | |
|---|---|---|---|---|
| EP | 3471493 A1 * | 4/2019 | | H04W 76/18 |
| WO | 2020154496 A1 | 7/2020 | | |

OTHER PUBLICATIONS

International Search Report and Written Opinion—PCT/CN2020/109517—ISA/EPO—May 14, 2021.

LG Electronics Inc: "Relaying Mechanism for NR Sidelink", 3GPP TSG-RAN WG2 Meeting #111 Electronic, R2-2008019, Online, Aug. 17,2020-Aug. 28, 2020, pp. 1-4, Aug. 2020 ( AUg. 7, 2020) section 2.3, section 2.4, figures 2.1, 2.2.

LG Electronics Inc: "Scope and Scenarios for NR Sidelink Relay", 3GPP TSG-RAN WG2 Meeting #111 Electronic, R2-2008017, Online, Aug. 17, 20200817-20201828, pp. 1-3, Aug. 7, 2020 (Aug. 7, 2020) the whole document.

* cited by examiner

1200 ⟶

1202

DETECT, ON AT LEAST ONE OF A FIRST LINK BETWEEN A FIRST RELAY UE AND A FIRST NETWORK ENTITY OR A SECOND LINK BETWEEN THE REMOTE UE AND THE FIRST RELAY UE, A RADIO LINK FAILURE (RLF) RESULTING IN A LOSS OF RADIO RESOURCE CONTROL (RRC) CONNECTION

1204

ATTEMPT TO REESTABLISH RRC CONNECTION BY PERFORMING AT LEAST ONE OF RELAY SELECTION OR CELL SELECTION

FIG. 12

RRC RE-ESTABLISHMENT AND RADIO LINK FAILURE REPORTING IN SIDELINK RELAY SYSTEMS

CROSS-REFERENCE TO RELATED APPLICATION(S)

This application is a national stage application under 35 U.S.C. 371 of PCT/CN2020/109517, filed Aug. 17, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to techniques for performing radio resource control (RRC) connection reestablishment after a user equipment (UE) detects a radio link failure in a sidelink relay system.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a remote UE. The method generally includes detecting, on at least one of a first link between a first relay UE and a first network entity or a second link between the remote UE and the first relay UE, a radio link failure (RLF) resulting in a loss of radio resource control (RRC) connection and attempting to reestablish RRC connection by performing at least one of relay selection or cell selection.

Certain aspects, provide a method for wireless communications by a network entity. The method generally includes receiving, from a remote user equipment (UE), a radio resource control (RRC) reestablishment request message, determining if the remote UE was previously connected to the network entity or another network entity via a first relay UE, retrieving a context of the remote UE from the other network entity if the UE was previously connected to the other network entity, and transmitting an RRC reestablishment message or RRC setup message to the remote UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 12 illustrates example operations for wireless communications by a remote UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
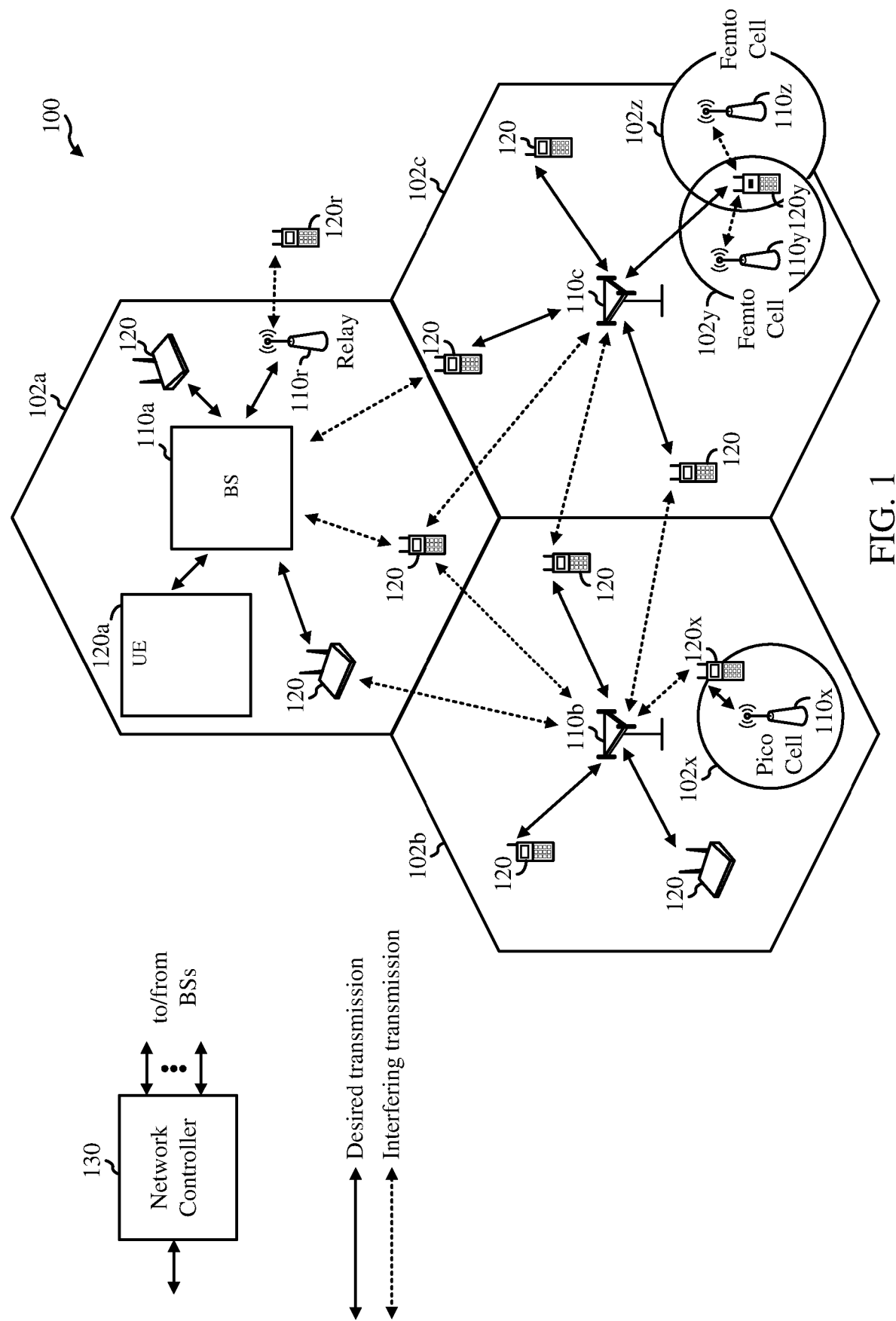
FIG. 1 is a block diagram conceptually illustrating an example telecommunications system, in accordance with certain aspects of the present disclosure.

Aspects of the present disclosure relate to wireless communications, and more particularly, to techniques for performing radio resource control (RRC) connection reestablishment after a user equipment (UE) detects a radio link failure in a sidelink relay system.

The connection between the relay and the network entity, may be called a Uu connection or via a Uu path. The connection between the remote UE and the relay (e.g., another UE or a "relay UE"), may be called a PC5 connection or via a PC5 path. The PC5 connection is a device-to-device connection that may take advantage of the comparative proximity between the remote UE and the relay UE (e.g., when the remote UE is closer to the relay UE than to the closest base station). The relay UE may connect to an infrastructure node (e.g., gNB) via a Uu connection and relay the Uu connection to the remote UE through the PC5 connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

FIG. 1 illustrates an example wireless communication network 100 in which aspects of the present disclosure may be performed. For example, UEs 120a may be configured to perform operations 1200 described below with reference to FIG. 12, while a base station 110a may be configured to perform operations 1300 of FIG. 13.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay UEs (e.g., relay UE 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
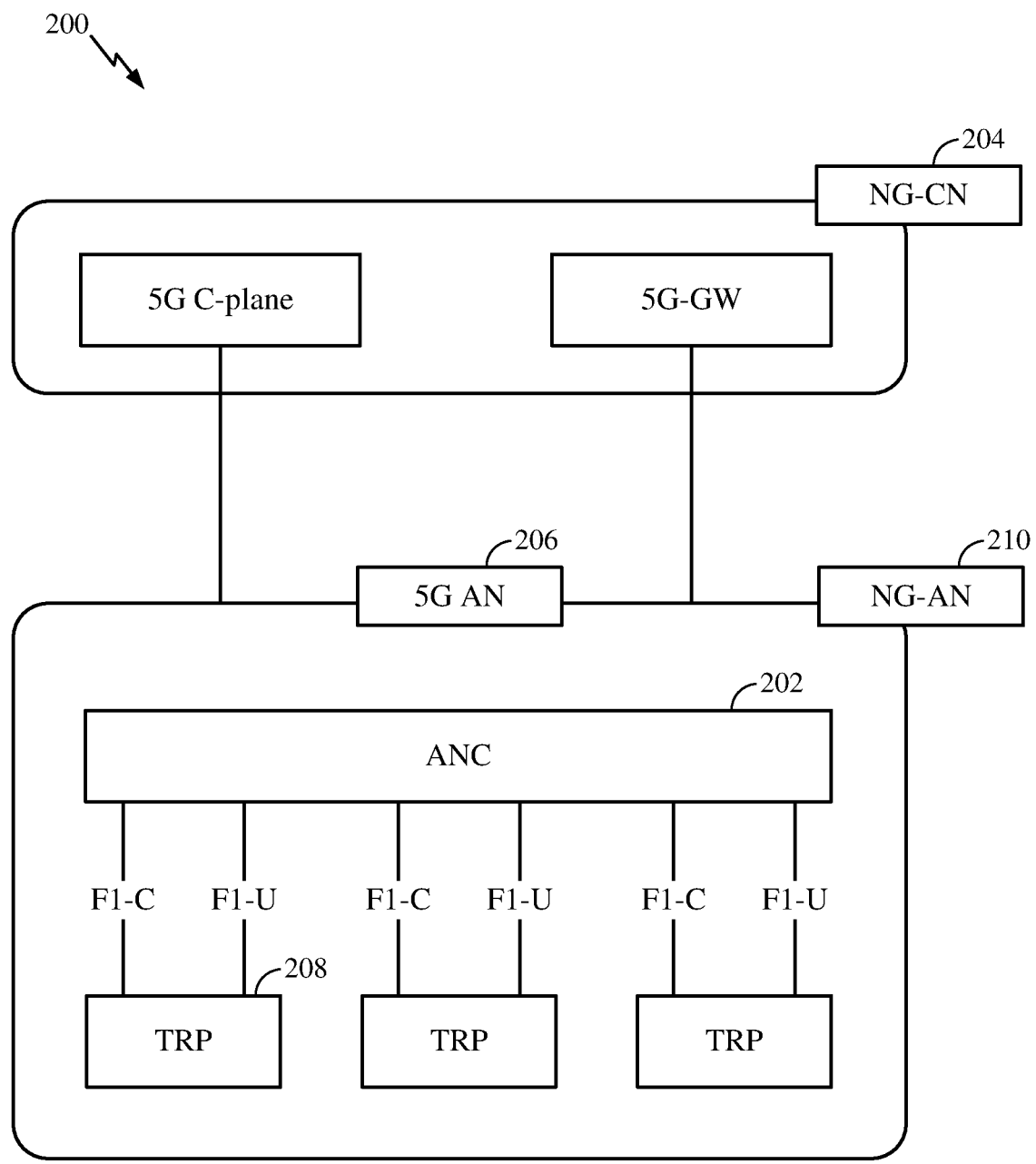
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
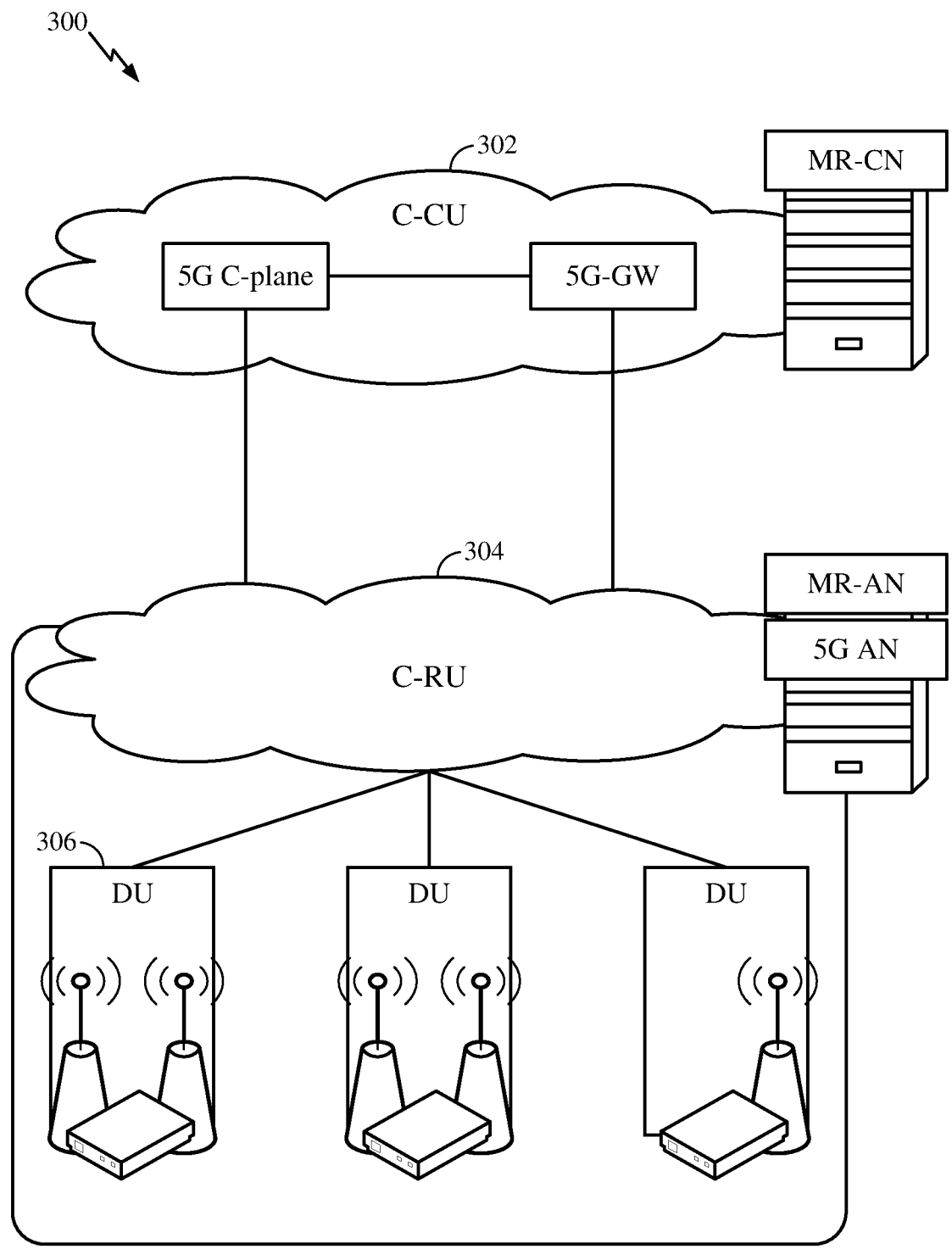
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
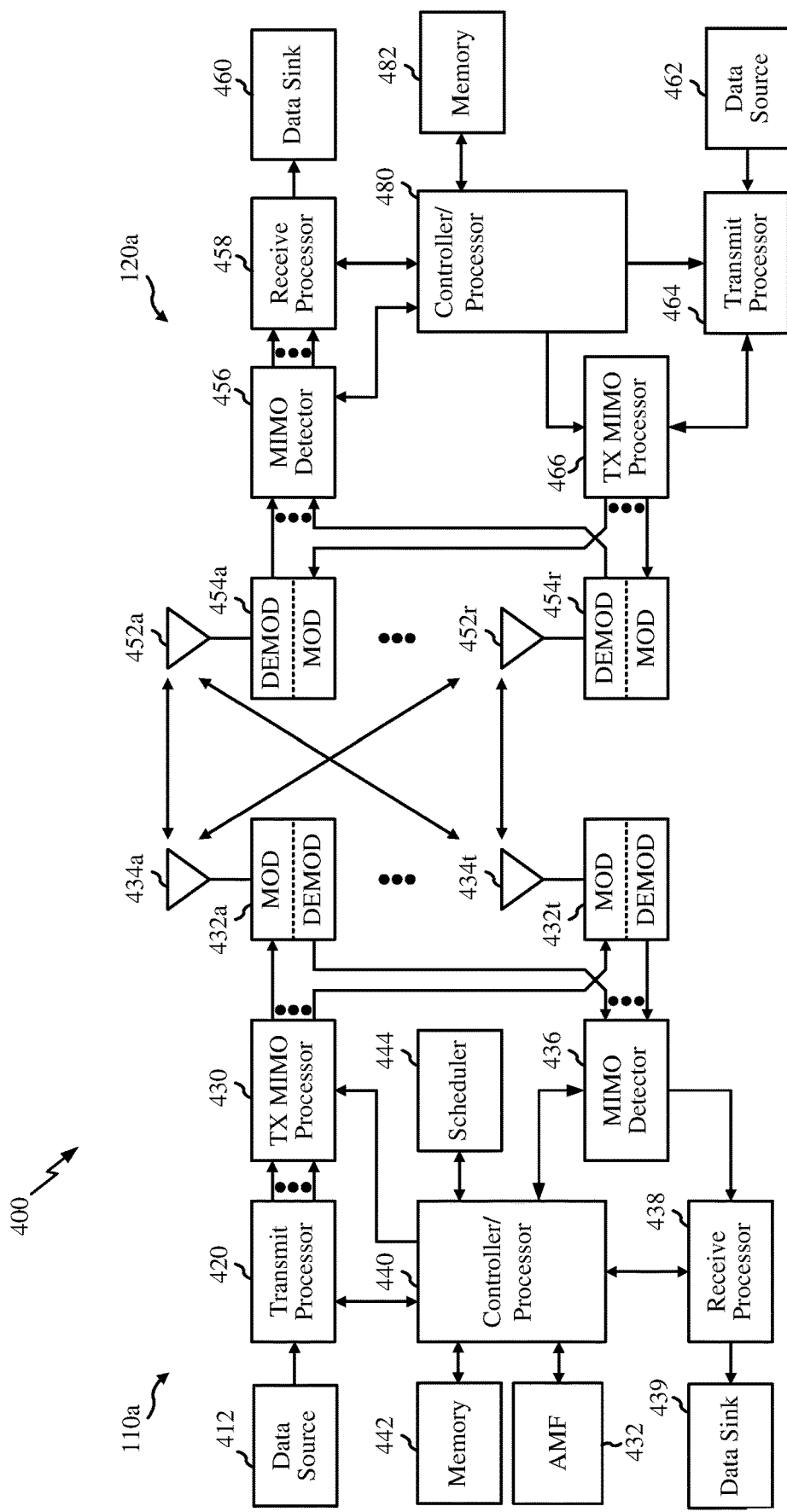
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIG. 12, while antennas 434, processors 420, 430, 438, and/or controller/processor 440 of the BS 110a may be used to perform the various techniques and methods described herein with reference to FIG. 13.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110*a*. At the BS 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example UE to NW Relay

Figure 5:
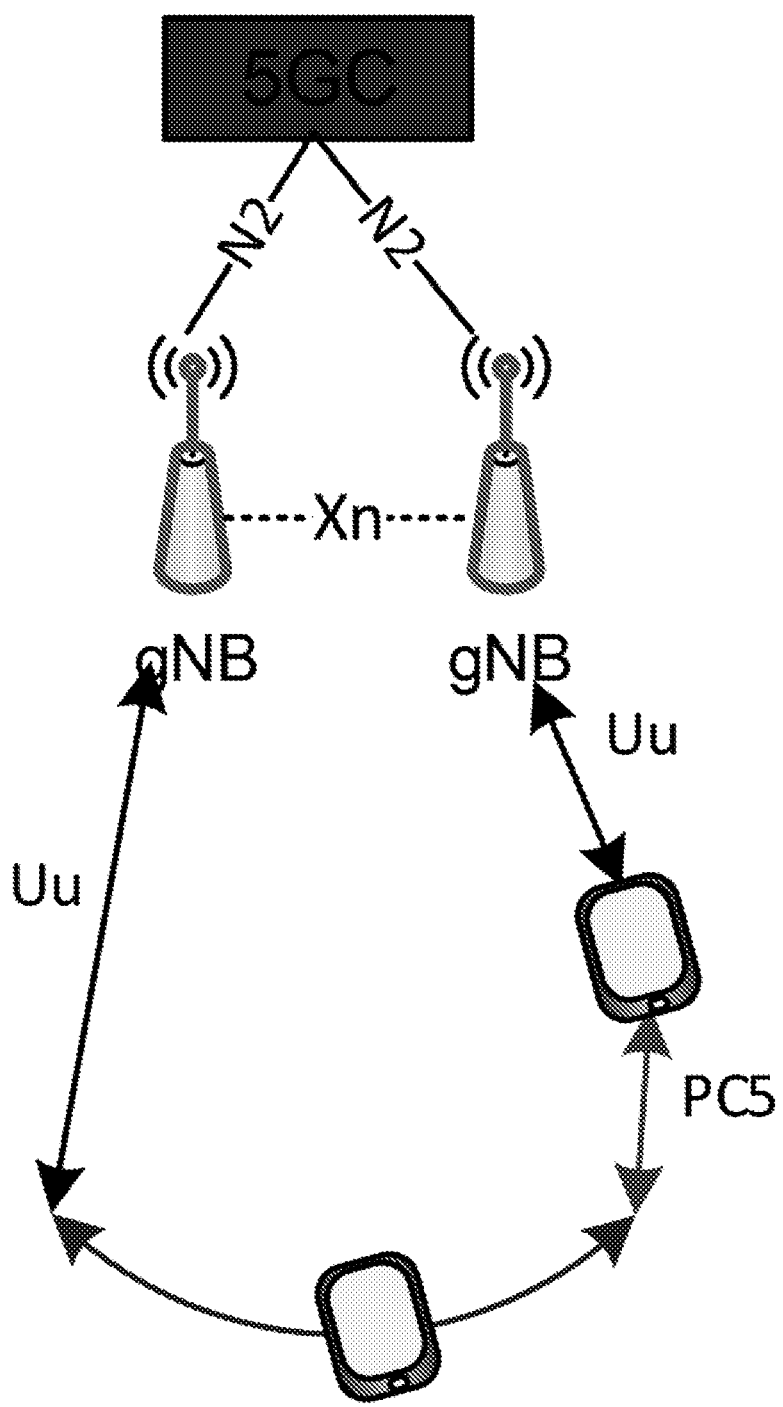
FIG. 5 is a high level path diagram illustrating example connection paths of a remote user equipment (UE), in accordance with certain aspects of the present disclosure.

Aspects of the present disclosure involves a remote UE, a relay UE, and a network, as shown in FIG. 5, which is a high level path diagram illustrating example connection paths: a Uu path (cellular link) between a relay UE and the network gNB, a PC5 path (D2D link) between the remote UE and the relay UE. The remote UE and the relay UE may be in radio resource control (RRC) connected mode.

Figure 6:
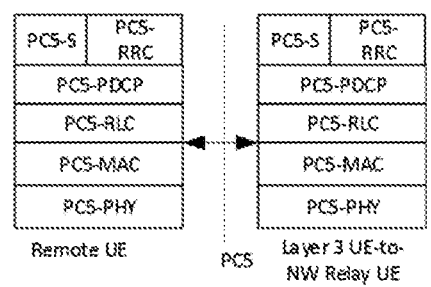
FIG. 6 is an example block diagram illustrating a control plane protocol stack on L3, when there is no direct connection path between the remote UE and the network node, in accordance with certain aspects of the present disclosure.
Figure 7:
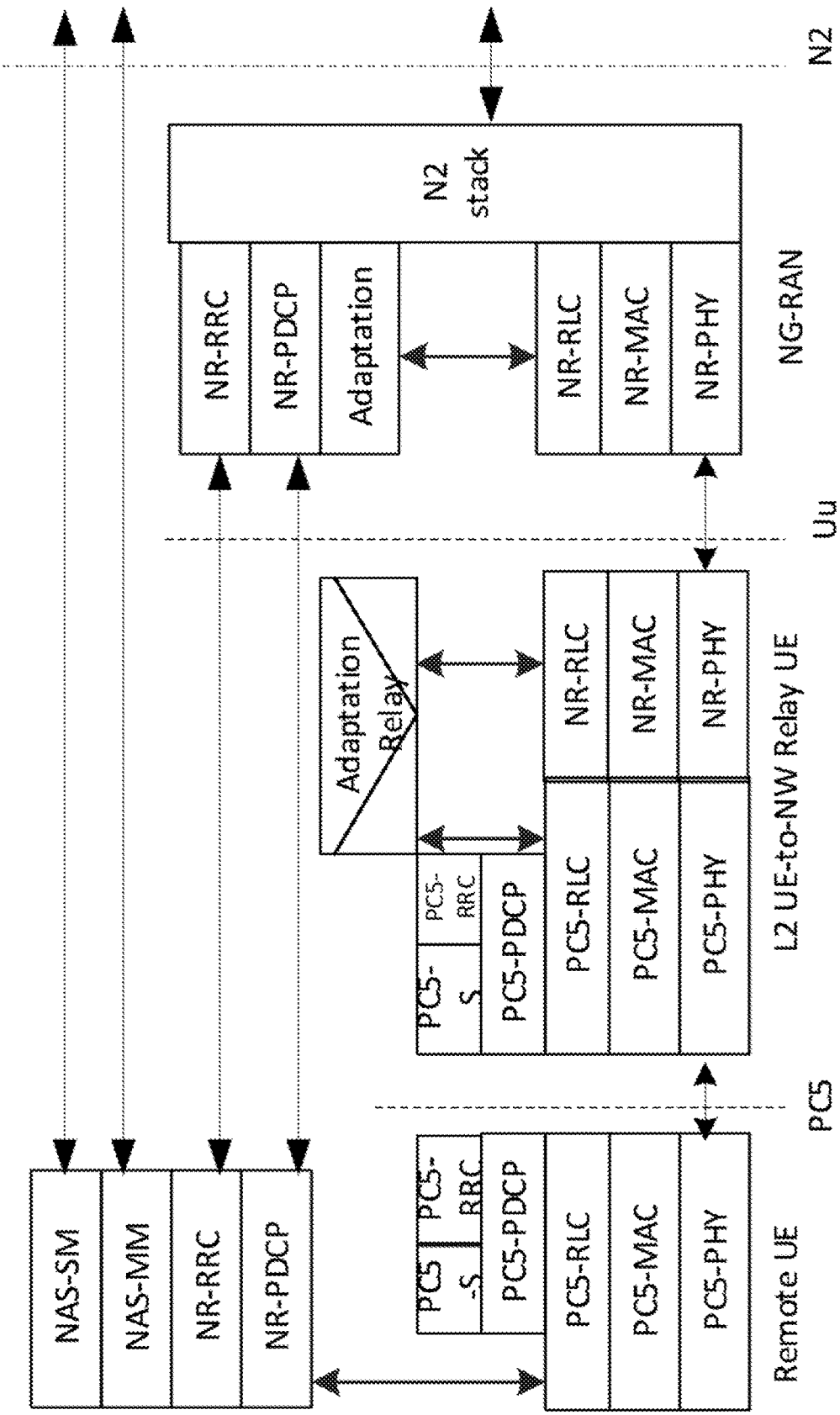
FIG. 7 is an example block diagram illustrating a control plane protocol stack on L2, when there is direct connection path between the remote UE and the network node, in accordance with certain aspects of the present disclosure.

As shown in FIG. 6 and FIG. 7, remote UE may generally connect to a relay UE via a layer 3 (L3) connection with no Uu connection with (and no visibility to) the network or via a layer 2 (L2) connection where the UE supports Uu access stratum (AS) and non-AS connections (NAS) with the network.

FIG. 6 is an example block diagram illustrating a control plane protocol stack on L3, when there is no direct connection path (Uu connection) between the remote UE and the network node. In this situation, the remote UE does not have a Uu connection with a network and is connected to the relay UE via PC5 connection only (e.g., Layer 3 UE-to-NW). The PC5 unicast link setup may, in some implementations, be needed for the relay UE to serve the remote UE. The remote UE may not have a Uu application server (AS) connection with a radio access network (RAN) over the relay path. In other cases, the remote UE may not have direct none access stratum (NAS) connection with a 5G core network (5GC). The relay UE may report to the 5GC about the remote UE's presence. Alternatively and optionally, the remote UE may be visible to the 5GC via a non-3GPP interworking function (N3IWF).

FIG. 7 is an example block diagram illustrating a control plane protocol stack on L2, when there is direct connection path between the remote UE and the network node. This control plane protocol stack refers to an L2 relay option based on NR-V2X connectivity. Both PC5 control plane (C-plane) and the NR Uu C-plane are on the remote UE, similar to what is illustrated in FIG. 6. The PC5 C-plane may set up the unicast link before relaying. The remote UE may support the NR Uu AS and NAS connections above the PC5 radio link control (RLC). The NG-RAN may control the remote UE's PC5 link via NR radio resource control (RRC). In some embodiments, an adaptation layer may be needed to support multiplexing multiple UEs traffic on the relay UE's Uu connections.

Certain systems, such as NR, may support standalone (SA) capability for sidelink-based UE-to-network and UE-to-UE relay communications, for example, utilizing layer-3 (L3) and layer-2 (L2) relays, as noted above.

Figure 8:
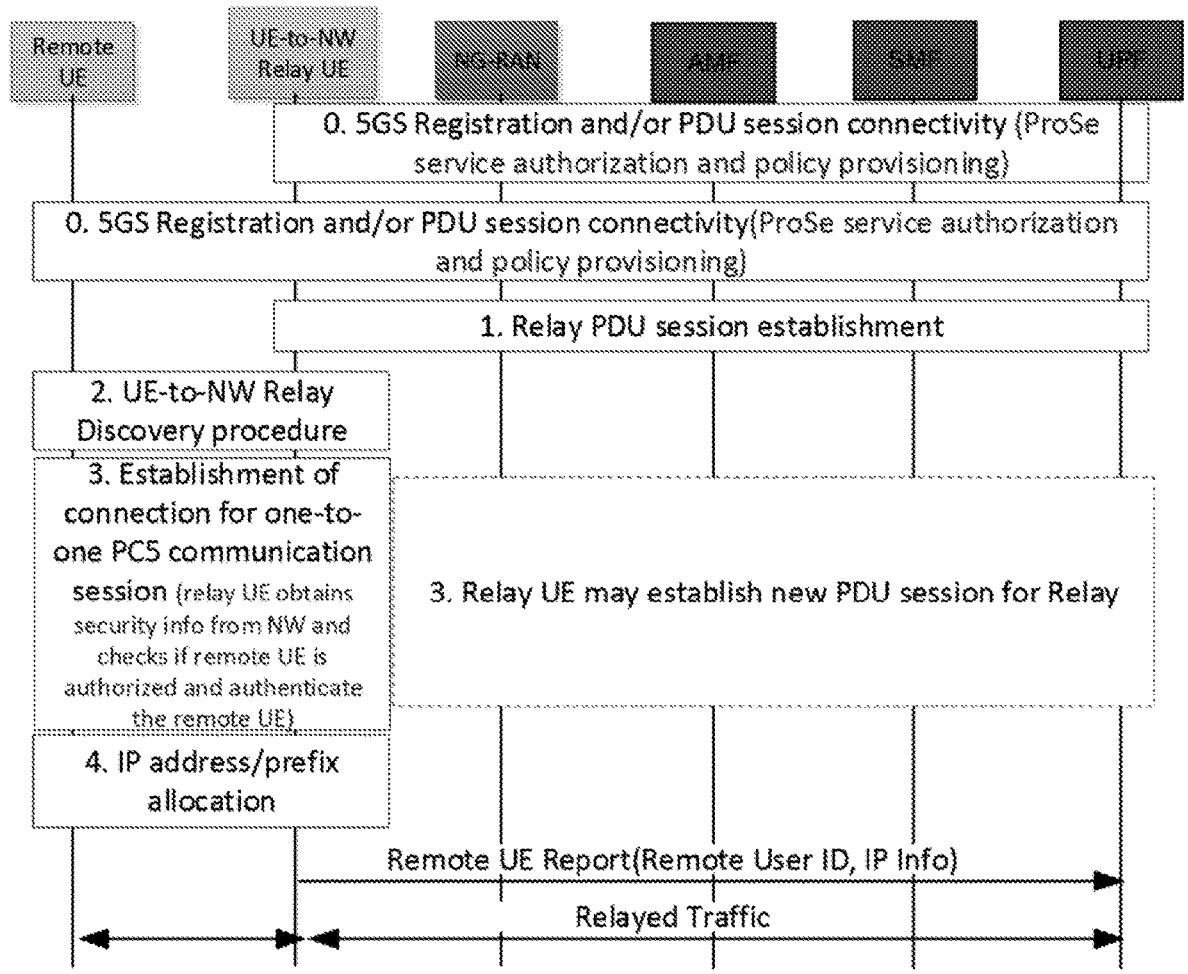
FIG. 8 illustrates example layer 3 (L3) relay procedures, in accordance with certain aspects of the present disclosure.

Particular relay procedures may depend on whether a relay is a L3 or L2 relay. FIG. 8 illustrates an example dedicated PDU session for an L3 relay. In the illustrated scenario, a remote UE establishes PC5-S unicast link setup and obtains an IP address. The PC5 unicast link AS configuration is managed using PC5-RRC. The relay UE and remote UE coordinate on the AS configuration. The relay UE may consider information from RAN to configure PC5 link. Authentication/authorization of the remote UE access to relaying may be done during PC5 link establishment. In the illustrated example, the relay UE performs L3 relaying.

Figure 9:
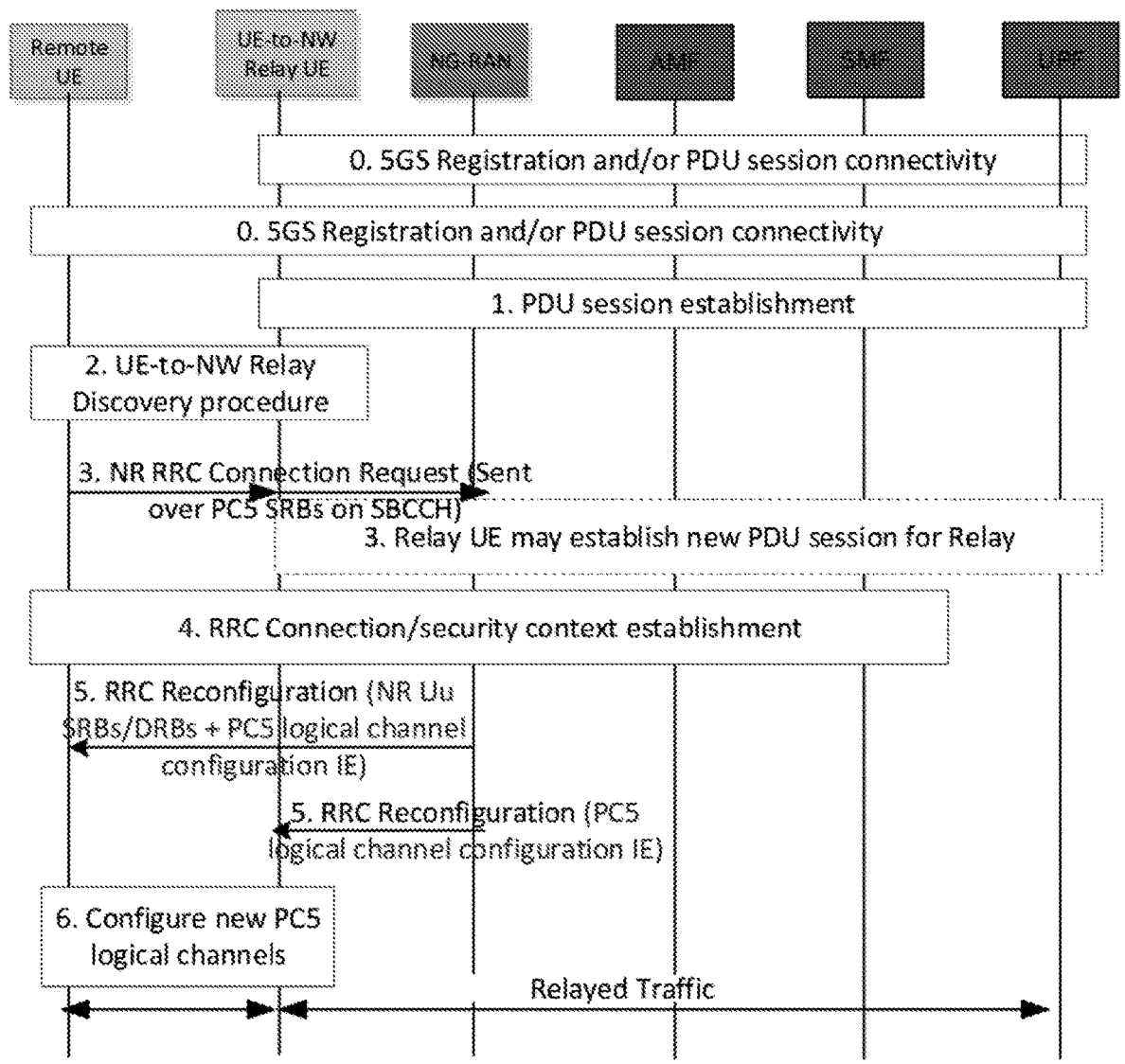
FIG. 9 illustrates example layer 2 (L2) relay procedures, in accordance with certain aspects of the present disclosure.

FIG. 9 illustrates an example dedicated PDU session for an L2 relay. In the illustrated scenario, there is no PC5 unicast link setup prior to relaying. The remote UE sends the NR RRC messages on PC5 signaling radio bearers (SRBs) over a sidelink broadcast control channel (SBCCH). The RAN can indicate the PC5 AS configuration to remote UE and relay UE independently via NR RRC messages. Changes may be made to NR V2X PC5 stack operation to support radio bearer handling in NR RRC/PDCP but support corresponding logical channels in PC5 link. In L2 relaying, PC5 RLC may need to support interacting with NR PDCP directly.

Typically, before the remote UE connected to the relay, it follows the legacy UE IDLE/INACTIVE behavior in NR Rel-16 (i.e. reception of Uu paging, monitoring Uu SIB, and trigger RRC setup upon reception of Uu paging).

After the remote UE is connected to one relay (i.e. PC5 RRC established), it can be configured to receive paging and SIB from relay, for a better coverage. The remote UE may be in IDLE/INACTIVE/out of coverage (OOC) state before being connected to relay. The network may configure the relay node to also monitor the remote UE's paging, in which case the remote UE may stop monitoring paging and SIB reception (for coverage and power saving). Upon reception of remote UE's paging, the relay UE may notify the remote UE via dedicated PC5 RRC message (e.g., without the need to introduce a new message). The remote UE can trigger RRC setup/resume, and perform unified access control (UAC). Upon reception of updated SIB(s), the relay UE forwards them to the remote UE via dedicated PC5 RRC message. The remote UE may only be interested in some particular SIB(s). In the preceding discussion, reference to RRC states refer to Uu RRC state.

There are various issues to be addressed with sidelink relay DRX scenarios. One issue relates to support of a remote UE sidelink DRX for relay discovery. One assumption for relay discover in some cases is that the Relay UE is in CONNECTED mode only, rather than IDLE/INACTIVE. A remote UE, may be in a CONNECTED, IDLE/INACTIVE or out of coverage (OOC) states.

Mechanisms may also be provided for relay selection and reselection. Relay selection generally refers the procedure whereby a remote UE has not connected to any relay node, discovers relay nodes whose sidelink discovery reference signal receive power (SD-RSRP) is above a threshold level (possibly by some amount) and, from among them, selects the relay node with best SD-RSRP. Relay re-selection generally refers the procedure whereby the remote UE has connected to one relay node (e.g., already performed relay selection), when SD-RSRP of the current relay node falls below a threshold level (possibly by some amount), the remote UE discovers relay nodes whose SD-RSRP is above a threshold level (possibly by some amount) and, among them, (re-) selects the relay node with the best SD-RSRP.

Figure 10A:
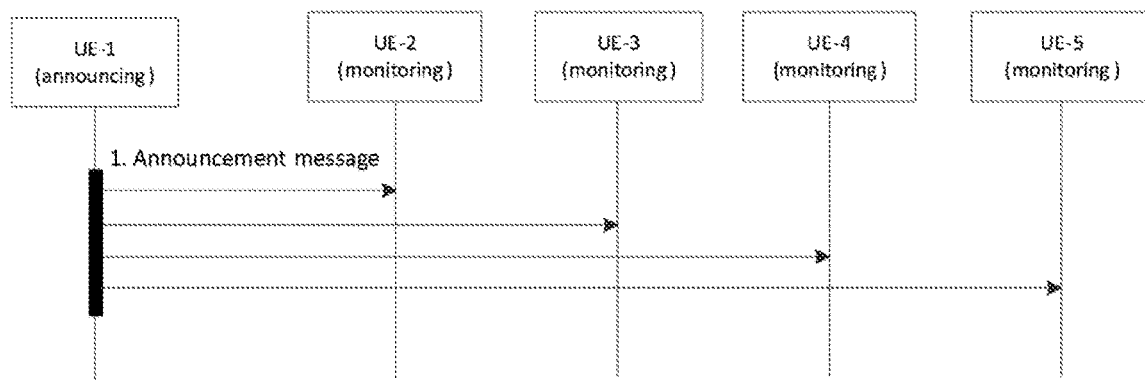
FIGS. 10A and 10B illustrate example relay discovery procedures.

Discovery for both relay selection and reselection may be supported. Different type of discovery models may be supported. For example, a first model (referred to as Model A discovery) is shown in FIG. 10A. In this case, a UE sends discovery messages (e.g., an announcement) while other UEs monitor for such discovery messages.

In some cases, relay service codes may identify the connectivity service that a relay UE (e.g., a ProSe Relay UE) provides. The relay service codes may be, for example, pre-configured or provisioned by a policy control function (PCF) to the UEs. In some cases, security information for discovery messages may be provisioned during key management process. Remote UEs may discover the relay UE by monitoring only corresponding relay service code(s).

Figure 10B:
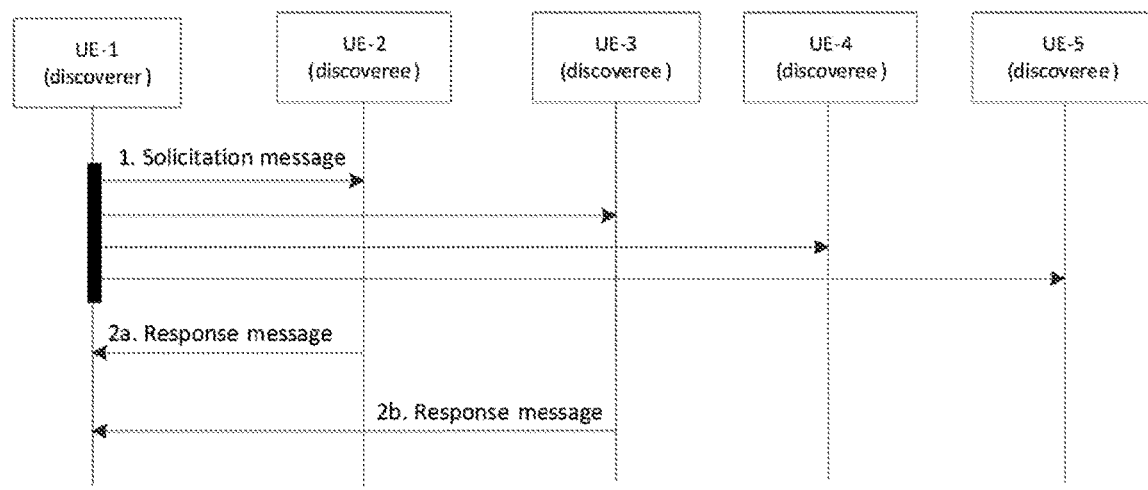

According to a second model (referred to as Model B discovery) shown in FIG. 10B, a UE (discoverer) sends a solicitation message and waits for responses from monitoring UEs (discoverees). Such discovery messages may be sent on a PC5 communication channel (e.g., and not on separate discovery channel). Discovery messages may be carried within the same layer-2 frames as those used for other direct communication including, for example, the Destination Layer-2 ID that can be set to a unicast, groupcast or broadcast identifier, the Source Layer-2 ID that is always set to a unicast identifier of the transmitter, and the frame type indicates that it is a ProSe Direct Discovery message.

As noted above, for relay selection, the remote UE has not connected to any relay node (i.e. PC5 unicast link is not established between remote UE and relay node). In this case, it may be desirable to design DRX modes to reduce remote UE power consumption on monitoring relay discovery messages for relay selection.

As noted above, for relay reselection, the remote UE has connected to at least one relay node (e.g., with a PC5 unicast established between the emote UE and relay node). For relay reselection, it may be desirable to design a DRX configuration that helps reduce remote UE power consumption while monitoring for relay discovery messages for relay reselection and PC5 data transmission.

Figure 11:
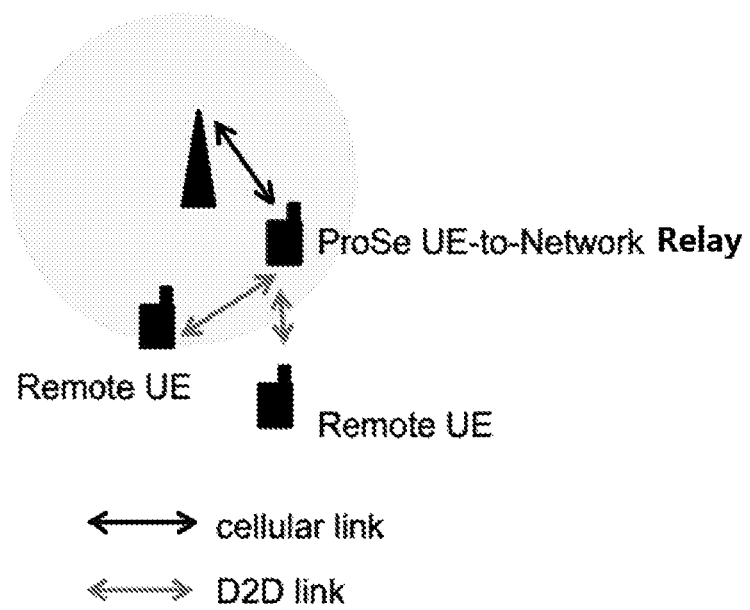
FIG. 11 illustrates an example communications environment in which a relay UE serves one or more remote UEs.

FIG. 11 illustrates an example environment in which remote UEs are served by a network entity through a UE-to-network relay (e.g., a relay UE). To communicate through a relay UE, a remote UE, which has not connected to a relay node, may discover relay nodes and select one or more of the relay nodes as the remote UE's relay. The remote UE may, for example, discover all relay nodes with a sidelink discovery reference signal received power (SD-RSRP) above a first threshold value (e.g., more than min-Hyst above q-Rx-LevMin). The remote UE may also reselect a relay when the remote UE is already connected with a relay node. To do so, the remote UE can determine that the sidelink RSRP (SL-RSRP) is below a second threshold value (e.g., more than minHyst below q-Rx-LevMin), and based on the determination, discover relay nodes having an SD-RSRP above the first threshold value.

Example RRC Re-Establishment and RLF Reporting in Sidelink Relay Systems

One potential issue, in a L2 relay system, such as that described with reference to FIG. 9, is when an RLF (e.g., a PC5 RLF) is detected in the remote UE, the current RRC connection with the network is lost. Currently, there is no procedure specified to re-establish the RRC connection.

Aspects of the present disclosure, however, provide techniques for reestablishing RRC connection between a remote UE and a network entity after the remote UE has detected a radio link failure (RLF).

As will be described herein, upon detecting an RLF on Uu and/or PC5, the remote UE may attempt RRC connection reestablishment by performing cell selection and/or relay selection (because the RLF may effectively render the relay UE and/or current serving cell unsuitable).

Thus, the techniques presented herein may cover the case where a remote UE declares a Uu RLF (including failure to handover from PC5 to Uu), as well as the case where the remote UE declares a PC5 RLF (including failure to handover from Uu to PC5 or from PC5 to Uu). As will be described in greater detail below, in both of these cases, the remote UE can trigger different solutions based on joint cell selection and relay selection, such tat RRC re-establishment can be performed either via the Uu directly or via a relay (indirectly).

In general, a remote UE may declare a Uu RLF based on a number of conditions, for example, that occur within a radio link monitoring (RLM) timer (e.g., T310). For example, RLF may occur when a maximum number of retransmissions of radio link control (RLC) is reached. As another example, RLF may occur when a maximum number of random access channel (RACH) preamble (re) transmissions is reached, a Uu security failure or reconfiguration failure occurs.

In general, a (remote or relay) UE may declare a PC5 RLF based on a number of conditions. For example, RLF may occur when a maximum number of retransmissions of radio link control (RLC) is reached. Another condition may be when reconfiguration fails (e.g., T400 expiry). As another example, RLF may occur when a maximum number of consecutive hybrid automatic repeat request (HARQ) discontinuous transmissions (DTX) for one destination is reached. Further, RLF may occur when a PC5 internet protocol (IP) check fails. It should be noted that each of the above mentioned conditions may be transmission (TX) detected RLF or reception (RX) detected RLF.

Upon declaration of PC5 RLF, the access stratum (AS) layer of the UE may send a PC5 RLF indication including a PC5 link identifier to an upper layer (e.g., a vehicle-to-everything (V2X) layer) to indicate the PC5 unicast link whose RLF declaration was made, and a PC5 radio resource control (RRC) connection was released. If the UE is in a connected mode, the UE may report, to a network entity, whether RLF and/or reconfiguration failure occurred.

In some cases of RLF, joint cell (re) selection and/or relay (re) selection may be accomplished either before or after a remote UE is connected to the relay UE. In the case of before the remote UE is connected to the relay UE, the remote UE may first perform cell (re) selection (e.g., attempt to search and camp in one "suitable" cell). If the cell (re) selection procedure fails (e.g., the remote UE cannot find any "suitable" cell), the remote UE regards it as out-of-coverage, and starts a relay selection procedure.

In the case of after the remote UE is connected to the relay UE, multiple options may exist. For example, if there is at least one "suitable" relay available, the remote UE may only perform relay (re) selection (i.e., not perform cell (re) selection). In other cases, the remote UE may regard relay UEs as inter radio access technology (RAT) cells, and thus perform joint cell reselection and relay reselection. In this case, the remote UE performs a relay reselection procedure to ensure that the connected relay is "suitable" and has the highest sidelink reference signal received power (SL-RSRP). Furthermore, the remote UE may regard the relay with which it is connected as its serving cell, and the remote UE may calculate a cell ranking criterion Rs, based on SL-RSRP and/or sidelink reference signal received quality (SL-RSRQ) and a hysteresis parameter QHyst broadcast by relay. Additionally, the remote UE may treat all Uu cells as neighbor cells, and the remote UE may perform a cell reselection procedure and calculate cell ranking criterion Rn based on their RSRP/RSRQ and $Q_{offset}$ broadcast by these cells. In another case, the remote UE may rank a cell according to the best relay which can be used to connect to that cell and the remote UE may consider relay downlink (DL) signal quality as a proxy for that cell.

As noted above, aspects of the present disclosure provide techniques for reestablishing RRC connection between a remote UE and a network entity after the remote UE has detected a radio link failure (RLF).

Accordingly, certain aspects of the present disclosure provide techniques for reestablishing RRC Connection after an RLF. As will be described in more detail, a remote UE may be configured to reestablish RRC Connection by first attempting to find a suitable cell, by first attempting to find a suitable relay, or simultaneously searching for both a suitable cell and suitable relay. The exact messaging to reestablish the RRC connection may depend on whether a suitable cell or suitable relay is found first. If a suitable cell is found first, the remote UE may send an RRC reestablishment request directly to the network (e.g., to a gNB of the suitable cell). If a suitable cell is found first, the remote UE may send an RRC reestablishment request to the network via the suitable cell.

FIG. 12 illustrates example operations 1200 for wireless communications by a remote UE, in accordance with aspects of the present disclosure. For example, operations 1200 may be performed by a UE 120a of FIG. 1 or FIG. 4 (acting as a remote UE) to reestablish RRC connection lost due to an RLF.

Operations 1200 begin, at 1202, by detecting, on at least one of a first link between a first relay UE and a first network entity or a second link between the remote UE and the first relay UE, a radio link failure (RLF) resulting in a loss of radio resource control (RRC) connection with the first network entity. At 1204, the relay UE attempts to reestablish RRC connection, with the first network entity or a second network entity, by performing at least one of relay selection or cell selection.

For example, a remote UE may detect a PC5 or Uu RLF and, in an effort to reestablish the RRC connection, may perform joint cell selection and relay selection, as described in greater detail below (with reference to FIGS. 14-17). Means for performing the functionalities of 1202 and 1204 can, but not necessarily, include, for example, antenna(s) 452, transceiver(s) 454, receive processor 458, controller/processor 480, and/or the like with reference to FIG. 4 and/or transceiver 1808, antenna 1810, and/or processing system 1802 with reference to FIG. 18.

Figure 13:
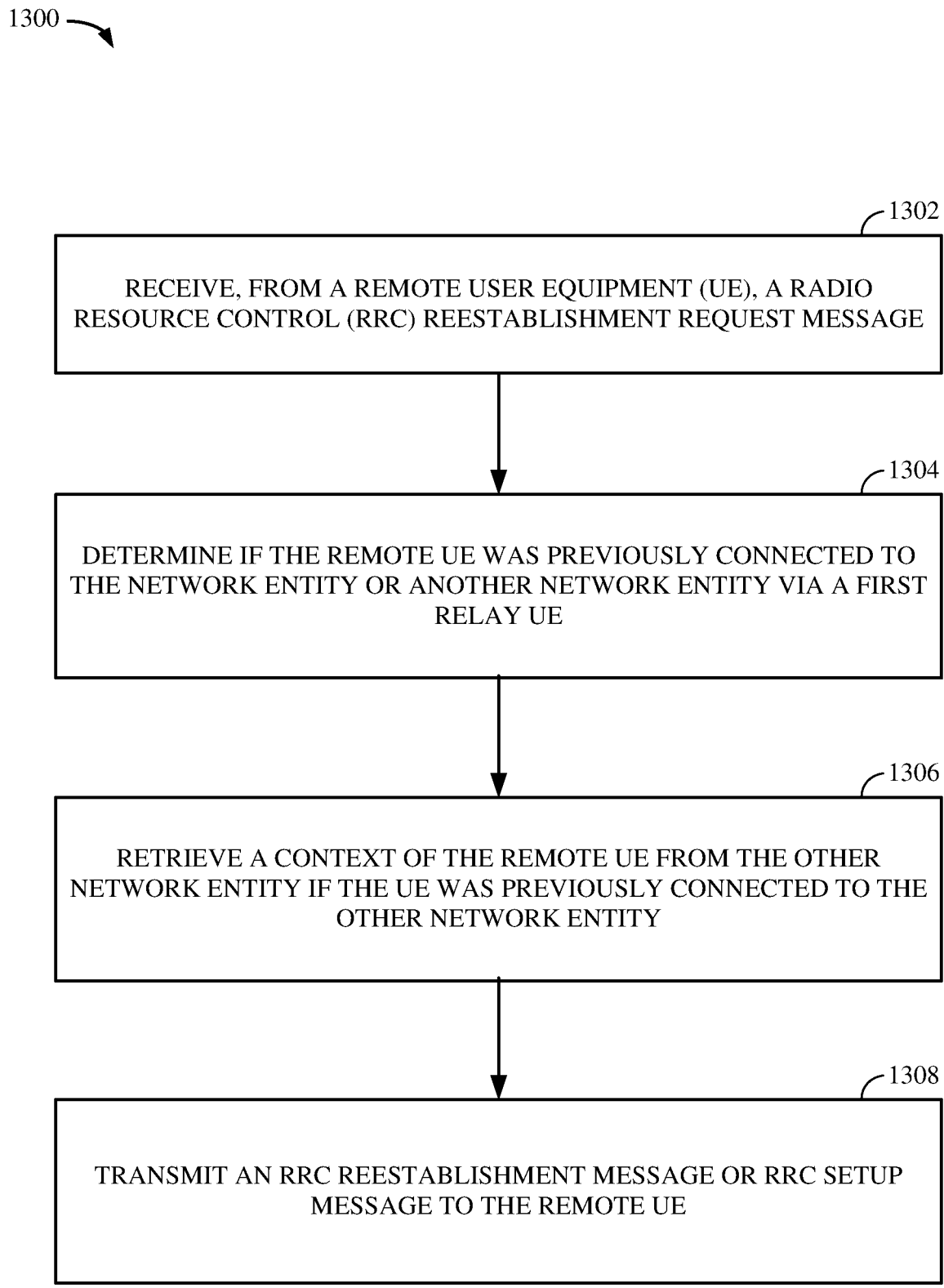
FIG. 13 illustrates example operations for wireless communications by a network entity, in accordance with certain aspects of the present disclosure.

FIG. 13 illustrates example operations 1300 for wireless communications that may be considered complementary to operations 1200 of FIG. 12. For example, operations 1300 may be performed by a BS 110 of FIG. 1 or FIG. 4 to participate in RRC connection reestablishment of a remote UE performing operations 1200 of FIG. 12.

Operations 1300 begin, at 1302, by receiving, from a remote user equipment (UE), a radio resource control (RRC) reestablishment request message. For example, as described in greater detail below (with reference to FIGS. 14-17) the network entity may receive the RRC reestablishment connection directly or (indirectly) via a relay.

At 1304, the network entity determines if the remote UE was previously connected to the network entity or another network entity via a first relay UE. At 1306, the network entity retrieves a context of the remote UE from the other network entity if the UE was previously connected to the other network entity. At 1308, the network entity transmits an RRC reestablishment message or RRC setup message to the remote UE.

Figure 19:
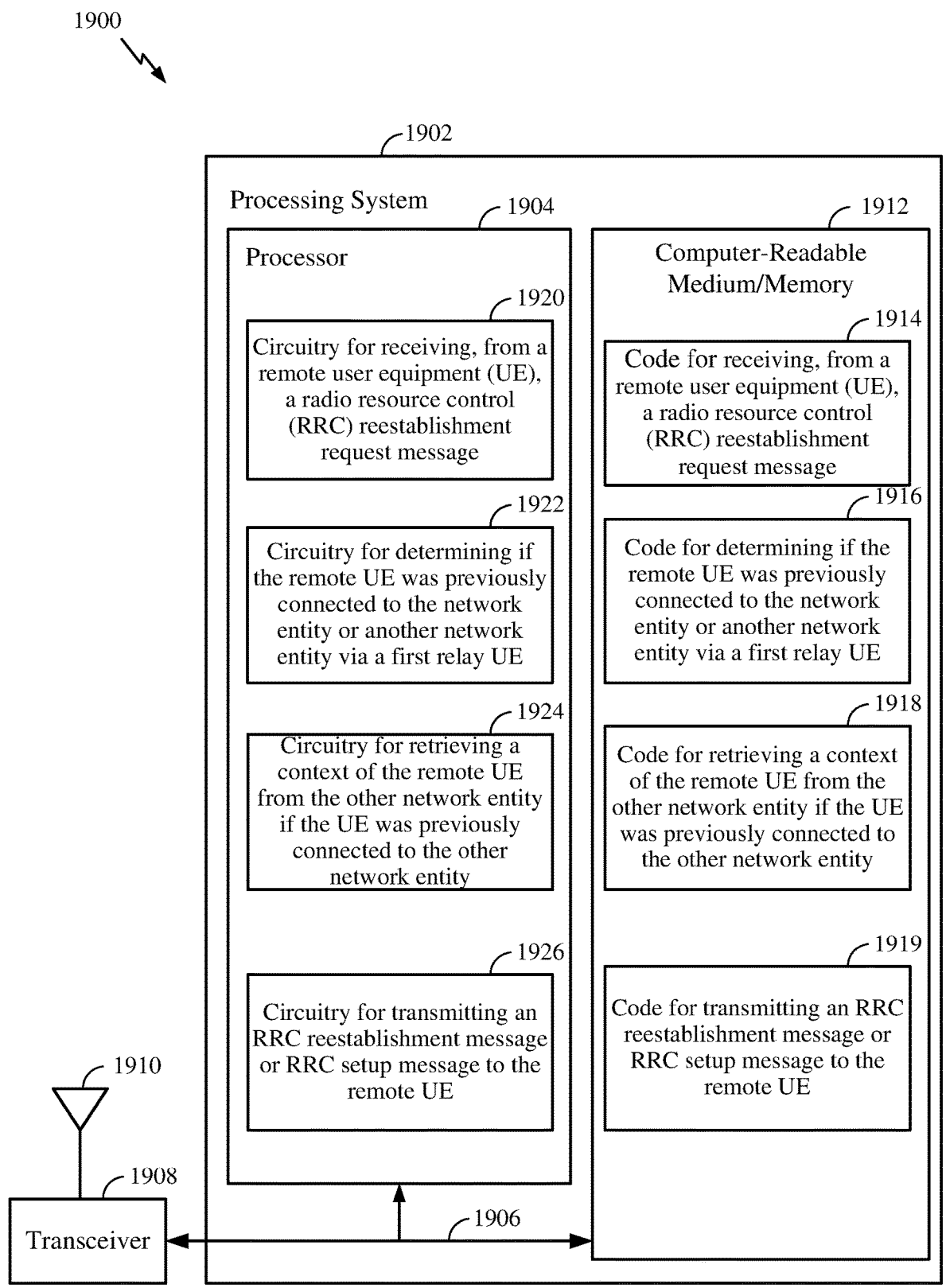
FIG. 19 illustrates a communications device that may include various components configured to perform the operations illustrated in FIG. 13, in accordance with certain aspects of the present disclosure.

Means for performing the functionalities of 1302, 1304, 1306, and 1308 can, but not necessarily, include, for example, Means for performing the functionalities of 1104 can, but not necessarily, include, for example, antenna(s) 434, transceiver(s) 432, receive processor 438, transmit processor 420, controller/processor 440, and/or the like with reference to FIG. 4 and/or transceiver 1908, antenna 1910, and/or processing system 1902 with reference to FIG. 19.

In some cases, upon detecting an RLF, a remote UE may attempt RRC connection reestablishment by performing joint cell selection and relay selection (e.g., simultaneously). In such cases, the remote UE may have no preference wither it re-establishes RRC via a gNB or a relay UE. Thus, in this case, the remote UE may be able to initiate RRC re-establishment procedure as long as either one suitable cell or one suitable relay is available.

In this cases, when an RLF is declared, the remote UE may start a timer (e.g., a T311 associated with a cell selection procedure), and may perform both cell selection and relay selection simultaneously. If the T311 expires, the remote UE may enter RRC IDLE.

If a suitable cell is found first (e.g., before the T311 timer expires), the remote UE may stop the timer and initiate an RRC re-establishment procedure by sending an RRCReestablishmentRequest message directly to a gNB (and starts a T301 timer used for RRC connection reestablishment). On the other hand, if a suitable relay is selected first (before a suitable cell is found and before the T311 timer expires), the remote UE may stop the T311 timer and initiate RRC re-establishment procedure by sending an RRCReestablishmentRequest message to a gNB via forwarding through the selected relay (and may start the T301 timer).

On the gNB side, upon reception of the RRCReestablishmentRequest message, the particular actions taken may depend on whether the re-established gNB (the gNB with which RRC connection is re-established) was previously connected or not. For example, if the re-established gNB was the gNB previously connected with the remote UE, there may be no need for a UE context retrieve procedure. On the other hand, if the re-established gNB is a new gNB, that gNB may trigger a UE context retrieve procedure with old gNB (that previously connected when the RLF was detected).

In either case, the re-establishment gNB may send the RRCReestablishment message to remote UE via a previous route (i.e. directly or via relay) if re-establishment procedure is a success. If re-establishment is not a success, the re-establishment gNB may send an RRCSetup message to the remote UE via a previous route (i.e. directly or via relay).

If the remote UE receives the RRCReestablishment message before the T301 timer expires, the remote UE may regard the RRC re-establishment procedure as successful. In this case, the remote UE may send an RRCReestablishmentComplete message to the re-established gNB via a previous route (i.e. directly or via relay). On the other hand, if an RRCSetup message is received before the T301 timer expires, the remote UE may send an RRCSetupComplete message to the gNB via a previous route (i.e. directly or via relay).

FIG. 14-17 illustrates example scenarios of RRC re-establishment by a remote UE that detects a PC5 RLF. The example scenarios differ in whether the remote UE re-establishes RRC connection with a same or new gNB and with a same or new relay. The illustrated procedures may be applied to an NG-interface and cross-RAT context retrieves.

Figure 14:
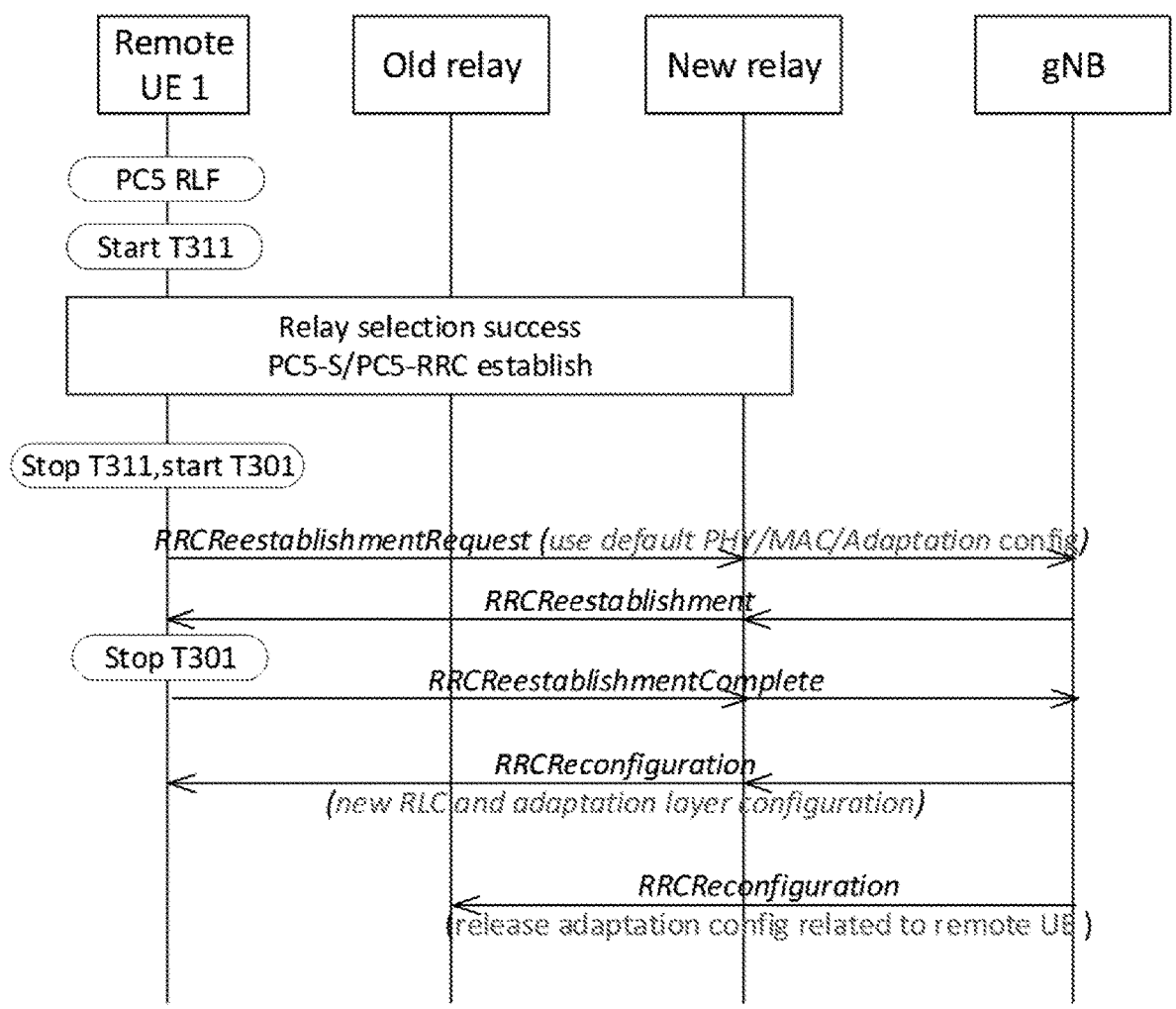
FIGS. 14-17 illustrate call flow diagrams of example scenarios in which a remote UE may reestablish RRC connection in a sidelink relay system, in accordance with certain aspects of the present disclosure.

FIG. 14 illustrates an example scenario of RRC re-establishment by a remote UE that detects a PC5 RLF and re-establishes the RRC connection with a same gNB, but via new relay. As illustrated, in this case, the remote UE may send the RRCReestablishmentRequest message via the relay with a default configuration (PHY/MAC/RLC/Adaptation layer configuration). In this cases, as noted above, the RRCReestablishment and RRCReestablishmentComplete messages may use the same route as the RRCReestablishmentRequest message.

Upon reception of RRCReestablishmentComplete, the gNB may reconfigure RLC and adaptation layer configurations for both the new relay and remote UE. Upon reception of RRCReestablishmentComplete, the gNB may also release the old relay adaptation layer configuration related to the remote UE (via RRCReconfiguration).

Figure 15:
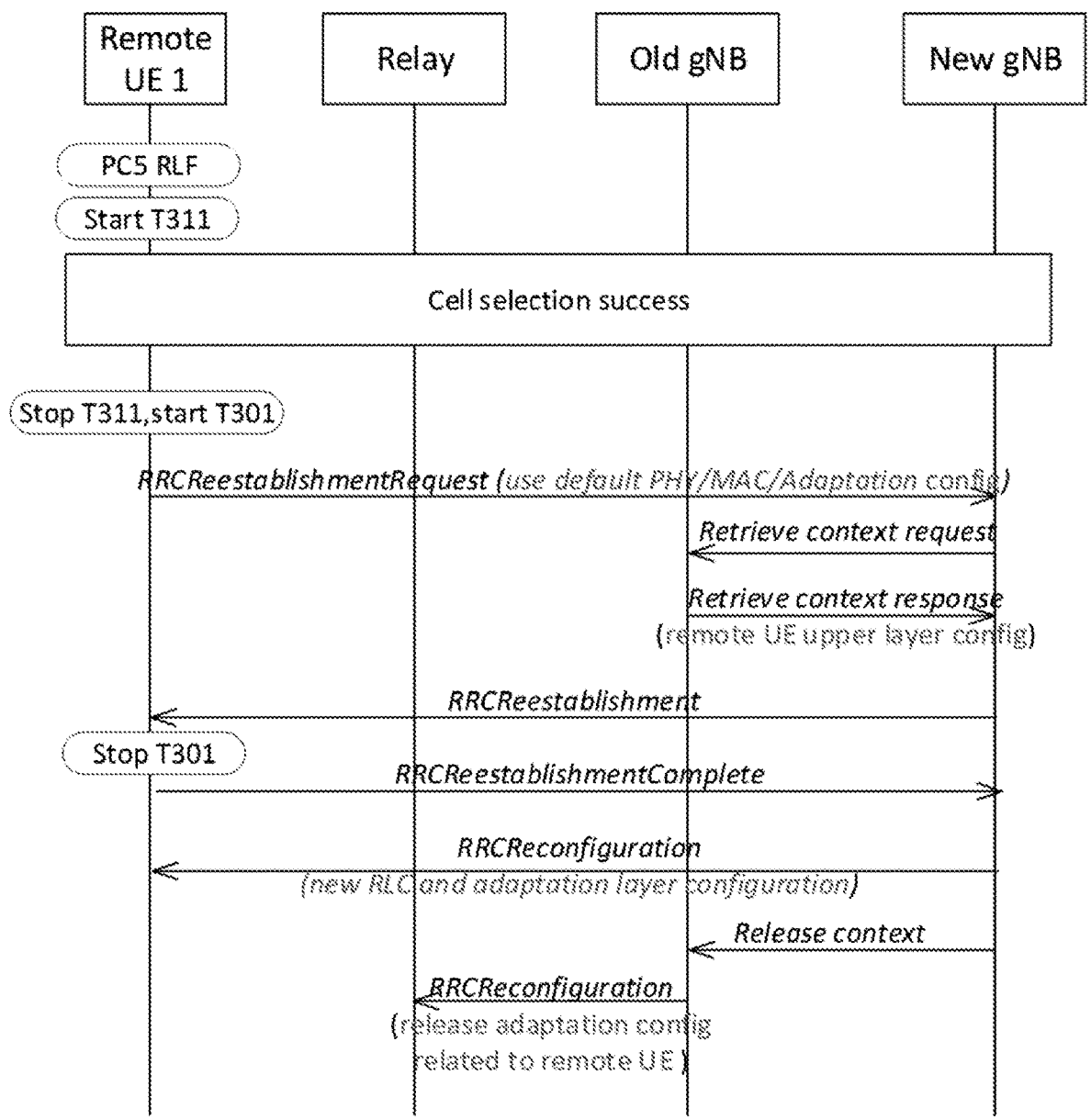

FIG. 15 illustrates an example scenario of RRC re-establishment by a remote UE with a different gNB (than the gNB serving the remote UE when the RLF was detected). A difference from the example in FIG. 14 is that, in this case, the re-established gNB, upon reception of the RRCReestablishmentRequest message, triggers a UE context fetch procedure to fetch the upper layer configuration (i.e., PDCP layer and above) of remote UE from the previous gNB.

As illustrated, the new gNB may then send a Release Context message to the old gNB, upon reception of RRCReestablishmentComplete. Upon reception of the Release Context message the old gNB may release the relay adaptation layer configuration related to the remote UE via (e.g., via RRCReconfiguration).

Figure 16:
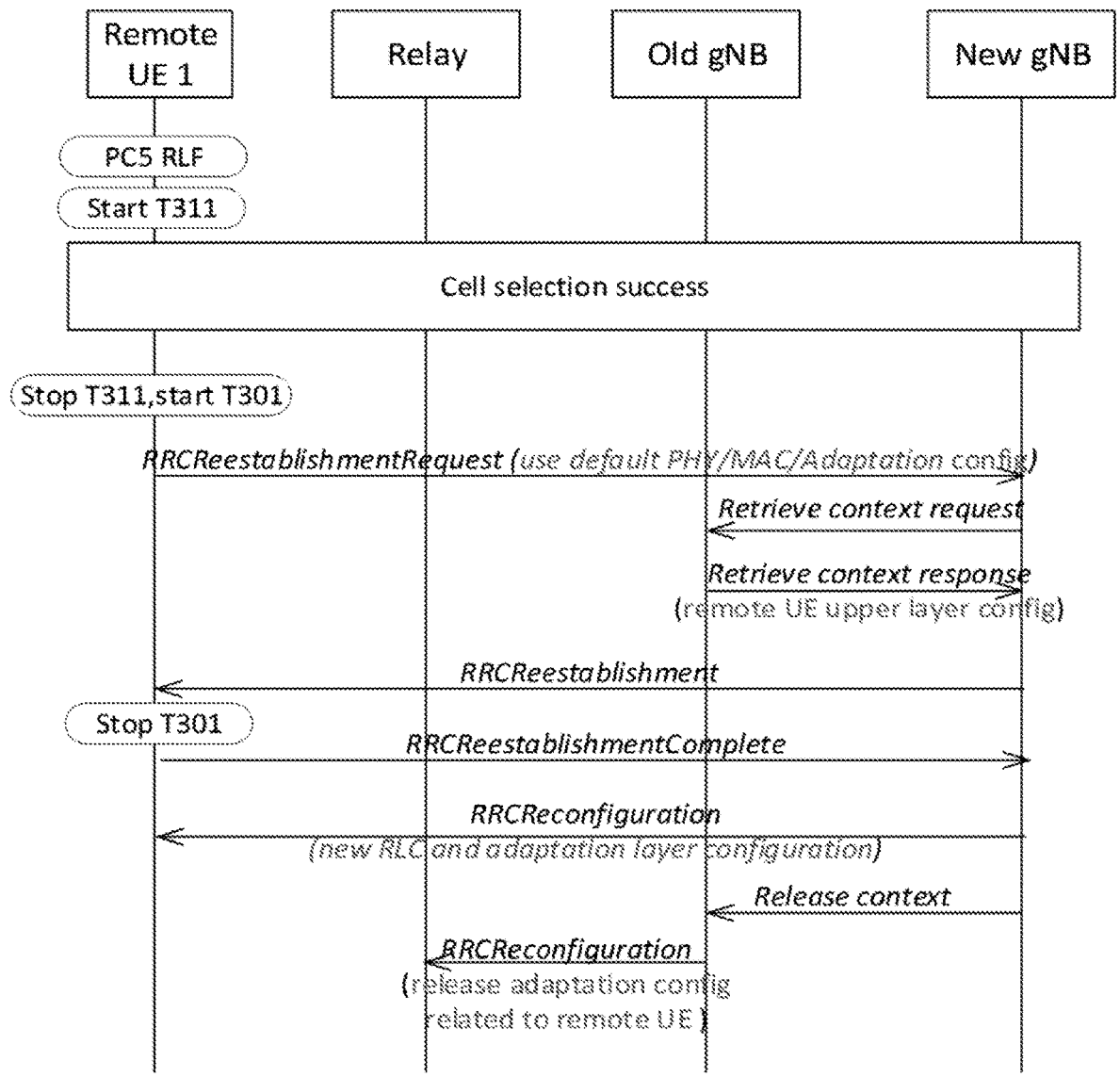

FIG. 16 illustrates an example scenario of RRC re-establishment by a remote UE with a RRC re-establish with a new gNB directly and a different relay. Relative to the examples shown in FIGS. 14 and 15, a difference is that, upon reception of the RRCReestablishmentComplete message, the new gNB sends a release context message to the old gNB and the old gNB releases adaptation layer configuration for the remote UE.

Figure 17:
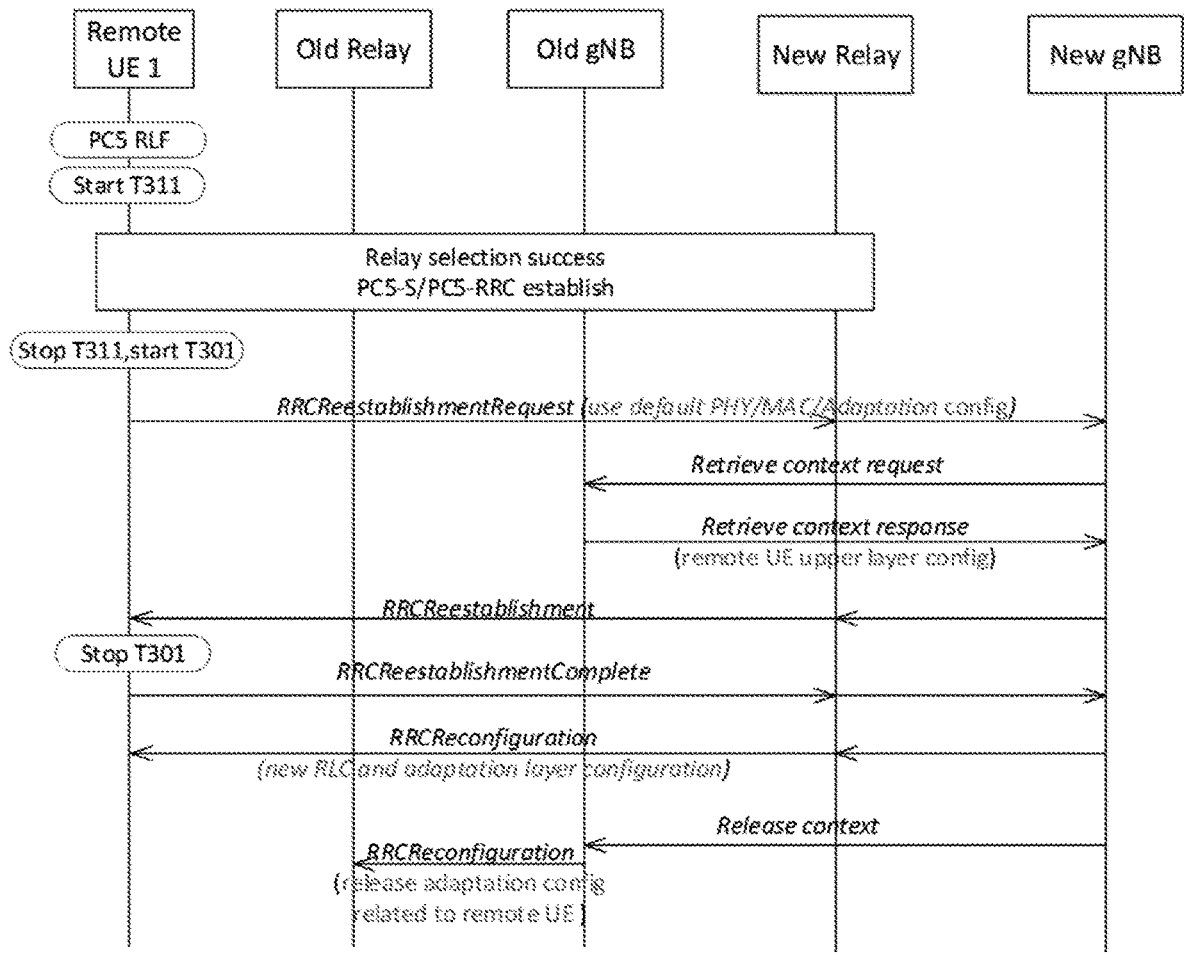

FIG. 17 illustrates an example scenario of RRC re-establishment by a remote UE with a new gNB via a new relay. Relative to the examples shown in FIGS. 14-16, in this cases, upon reception of the RRCReestablishmentComplete message, the gNB reconfigures RLC and adaptation layer configurations for both the new relay and the remote UE.

In some cases, a remote UE may be configured to give preference to either cell selection or relay selection when attempting to reestablish RRC connection after an RLF.

For example, by performing cell selection first, the remote UE may have a preference to re-establish RRC via gNB. Thus, in this case, the remote UE may first only trigger cell selection with one new timer (e.g., a new timer T391). In such cases, the remote UE may only trigger relay selection when the new timer T391 expires.

Upon RLF detection, the remote UE may start the T391 timer and perform only cell selection. If a suitable cell is selected first (before the T391 timer expires), the remote UE may stop the T391 timer and initiate RRC re-establishment procedure by sending RRCReestablishmentRequest message directly to gNB (and starting the T301 timer and performing the remaining operations described above for the example where the UE performs joint cell and relay selection (simultaneously).

In some cases, if the T391 timer expires, the remote UE may start the T311 timer and perform both cell selection and relay selection simultaneously (e.g., reverting or "falling back" to the joint selection example described above).

On the other hand, by performing relay selection first, the remote UE may give a preference to re-establish RRC connection via a relay. In this case, the remote UE first only triggers cell selection with one new timer (e.g., a new timer T392) and only triggers cell selection when the new timer T392 expires.

In this case, upon RLF detection, the remote UE starts T392, and performs only relay selection. If a suitable relay is selected first (before the T392 timer expires), the remote UE stops the T392 timer and initiates RRC the re-establishment procedure by sending the RRCReestablishmentRequest message to the gNB, via forwarding through the selected relay, and starts T301. If the T392 expires, the remote UE starts T311, and performs both cell selection and relay selection simultaneously, again reverting to the joint selection example described above.

In some cases, the UE may utilize a set of resources referred to as an exceptional pool, which generally refers to a set of resources used by a UE in transmission between RRC Idle and Connected states. The remote UE may be allowed to use (resources of) an exceptional pool for sidelink transmission during the period from RLF detection to RRC-re-establishment. For example, when the T311/T391 timer is running, the remote UE may use an exceptional pool provided by the cell in which the RLF was detected (the failed cell). When the T301 timer is running, the remote UE may use an exceptional pool provided by the cell in which the remote UE initiates re-establishment.

In some cases, whether the UE performs cell selection and relay selection jointly, gives preference to cell selection, or gives preference to relay selection may be configured. For example, the remote UE may be configured by the network via RRCreconfiguration or a system information (SIB), may be pre-configured, or configured via a policy control function (PCF). In some cases, certain preferences may be used in certain scenarios (e.g., relay selection may be performed first in the case of PC5 RLF.

In some cases, after the remote UE has RRC connection (reestablished) with a gNB, the remote UE may report the PC5 RLF report to the gNB. For example, the RRC connection may be via RRCReestablishment or RRCSetup and the remote UE may include the PC5 RLF report in a Uu UEinformationResponse message. In such cases, the UE may indicate the availability of the PC5 RLF report, for example, in an RRCSetupComplete or RRCReestablishmentComplete message.

The PC5 RLF report can be sent to gNB directly or via relay (e.g., if RRC connection is re-established via relay). The PC5 RLF report may include various contents, such as RLF cause, a remote UE ID, and/or available sidelink reference signal received power (SL-RSRP) measurements and Uu measurements.

Figure 18:
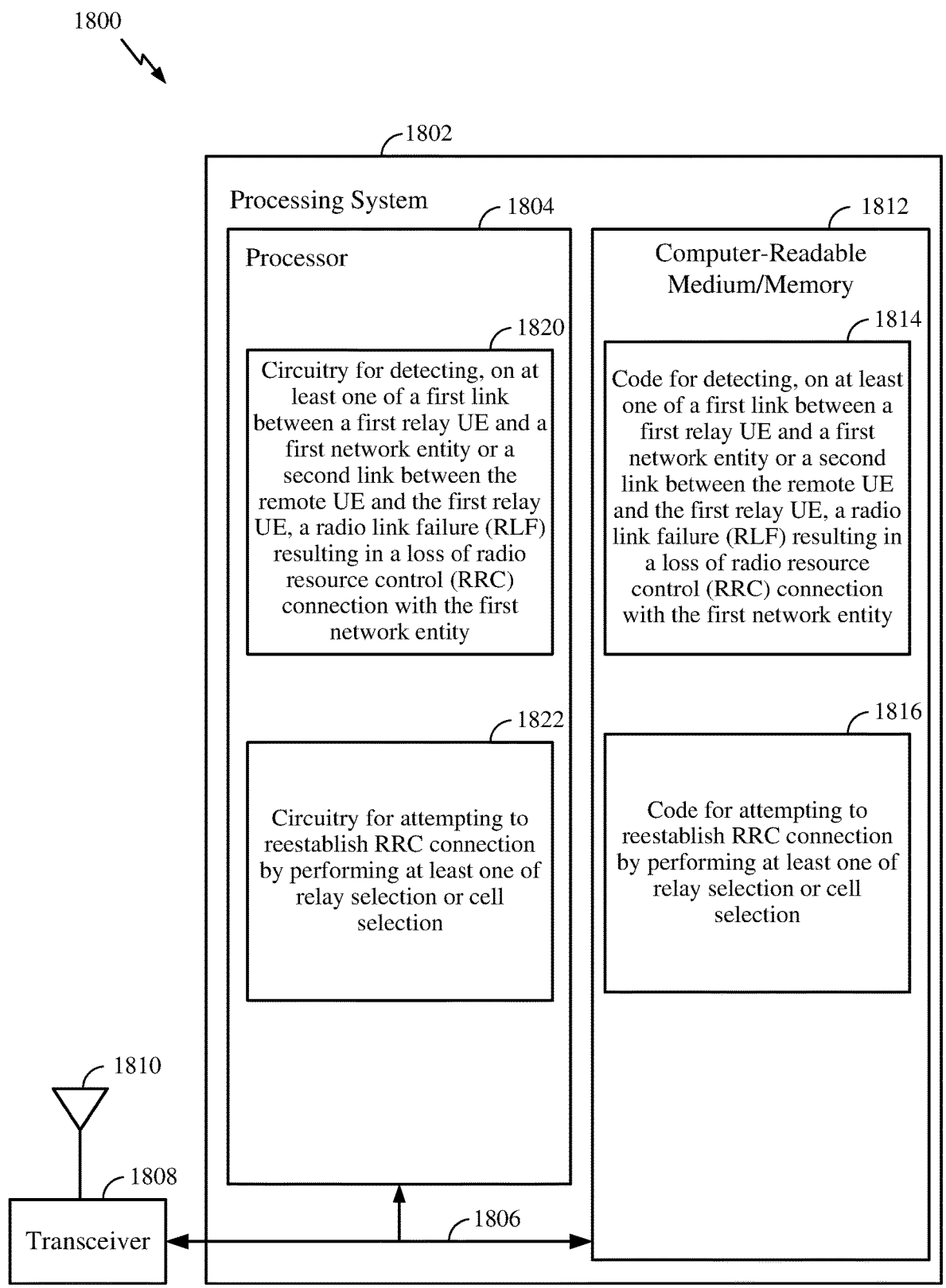
FIG. 18 illustrates a communications device that may include various components configured to perform the operations illustrated in FIG. 12, in accordance with certain aspects of the present disclosure.

FIG. 18 illustrates a communications device 1800 that may include various components (e.g., corresponding to means-plus-function components) configured to perform operations for the techniques disclosed herein, such as the operations illustrated in FIG. 12. For example, communication device 1800 may be a UE 180, such as shown in FIG. 1 or FIG. 4. The communications device 1800 includes a processing system 1802 coupled to a transceiver 1808 (e.g., transceiver 1808 is an example of transceiver(s) 454 of FIG. 4). The transceiver 1808 is configured to transmit and receive signals for the communications device 1800 via an antenna 1810 (e.g., antenna 1810 is an example of antenna(s) 452 of FIG. 4), such as the various signals as described herein. The processing system 1802 may be configured to perform processing functions for the communications device 1800, including processing signals received and/or to be transmitted by the communications device 1800.

The processing system 1802 includes a processor 1804 (e.g., processor 1804 is an example of one of the processors 458, 464, 466, and 480 of FIG. 4) coupled to a computer-readable medium/memory 1818 (e.g., medium/memory 1818 is an example of memory 482 of FIG. 4) via a bus 1806. In certain aspects, the computer-readable medium/memory 1812 is configured to store instructions (e.g., computer-executable code) that when executed by the processor 1804, cause the processor 1804 to perform the operations illustrated in FIG. 12, or other operations for performing the various techniques discussed herein. In certain aspects, computer-readable medium/memory 1812 stores code 1814 for detecting, on at least one of a first link between a first relay UE and a first network entity or a second link between the remote UE and the first relay UE, a radio link failure (RLF) resulting in a loss of radio resource control (RRC) connection; and code 1816 for attempting to reestablish RRC connection by performing at least one of relay selection or cell selection. In certain aspects, the processor 1804 has circuitry configured to implement the code stored in the computer-readable medium/memory 1812. The processor 1804 includes circuitry 1820 for; and circuitry 1822 for attempting to reestablish RRC connection by performing at least one of relay selection or cell selection. Circuitry 1820 and/or 182 could be specially designed circuitry for performing the indicated functions or could be general purpose circuitry configured or programmed to perform these functions.

FIG. 19 illustrates a communications device 1900 that may include various components (e.g., corresponding to means-plus-function components) configured to perform operations for the techniques disclosed herein, such as the operations illustrated in FIG. 19. For example, communication device 1900 may be a BS 110, such as shown in FIG. 1 or FIG. 4. The communications device 1900 includes a processing system 1902 coupled to a transceiver 1908 (e.g., transceiver 1908 is an example of transceiver(s) 432 of FIG. 4). The transceiver 1908 is configured to transmit and receive signals for the communications device 1900 via an antenna 1910 (e.g., antenna 1910 is an example of antenna(s) 434 of FIG. 4), such as the various signals as described herein. The processing system 1902 may be configured to perform processing functions for the communications device 1900, including processing signals received and/or to be transmitted by the communications device 1900.

The processing system 1902 includes a processor 1904 (e.g., processor 1904 is an example of one of the processors 420, 430, 438, and 440 of FIG. 4) coupled to a computer-readable medium/memory 1912 (e.g., medium/memory 1912 is an example of memory 442 of FIG. 4) via a bus 1906. In certain aspects, the computer-readable medium/memory 1912 is configured to store instructions (e.g., computer-executable code) that when executed by the processor 1904, cause the processor 1904 to perform the operations illustrated in FIG. 13, or other operations for performing the various techniques discussed herein. In certain aspects, computer-readable medium/memory 1912 stores code 1914 for receiving, from a remote user equipment (UE), a radio resource control (RRC) reestablishment request message; code 1916 for determining if the remote UE was previously connected to the network entity or another network entity via a first relay UE; code 1918 for retrieving a context of the remote UE from the other network entity if the UE was previously connected to the other network entity; and code 1919 for transmitting an RRC reestablishment message or RRC setup message to the remote UE. In certain aspects, the processor 1904 has circuitry configured to implement the code stored in the computer-readable medium/memory 1912. The processor 1904 includes circuitry 1920 for receiving, from a remote user equipment (UE), a radio resource control (RRC) reestablishment request message; circuitry 1922 for determining if the remote UE was previously connected to the network entity or another network entity via a first relay UE; circuitry 1924 for retrieving a context of the remote UE from the other network entity if the UE was previously connected to the other network entity; and circuitry 1926 for transmitting an RRC reestablishment message or RRC setup message to the remote UE. Circuitry 1920, 1922, 1924, and/or 1926 could be specially designed circuitry for performing the indicated functions or could be general purpose circuitry configured or programmed to perform these functions.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 12-13 may be performed by various processors shown in FIG. 4, such as processors 458, 464, 466, and/or controller/processor 480 of the UE 120*a*, and/or processors 430, 436, 438 and/or the controller/processor 440 of the BS 110*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 12-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a remote user equipment (UE), comprising:
    detecting, on at least one of a first link between a first relay UE and a first network entity or a second link between the remote UE and the first relay UE, a radio link failure (RLF) resulting in a loss of radio resource control (RRC) connection;
    attempting to reestablish RRC connection by performing relay selection to search for a suitable relay simultaneous with, before, or after cell selection to search for a suitable cell; and
    initiating an RRC re-establishment procedure by sending an RRC reestablishment request message directly to:
        a network entity of the suitable cell, or
        a network entity via the suitable relay.

2. The method of claim 1, wherein:
    the RLF comprises an RLF on a link between the first network entity and at least one of the remote UE or first relay UE; and
    a cause of the RLF relates to at least one of a start of a timer due to radio link monitoring (RLM), a maximum number of retransmissions of radio link control (RLC) is reached, a maximum number of random access channel (RACH) preamble retransmissions is reached, a security failure on a cellular link with a network entity, a reconfiguration failure, or a handover failure.

3. The method of claim 1, wherein:
    the RLF comprises an RLF on a link between the remote UE and the first relay UE; and
    a cause of the RLF relates to at least one of a maximum number of retransmissions of radio link control (RLC) is reached, a reconfiguration timer expiration, a maximum number of hybrid automatic retransmission request (HARQ) transmissions is reached, an internet protocol (IP) check failure, or a handover failure.

4. The method of claim 1, wherein performing relay selection simultaneous with, before, or after cell selection comprises performing relay selection simultaneous with cell selection, and wherein initiating the RRC re-establishment procedure comprises:
    responsive to finding the suitable cell before finding the suitable relay, initiating the RRC re-establishment procedure by sending the RRC reestablishment request message directly to the network entity of the suitable cell; or
    responsive to finding the suitable relay before finding the suitable cell, initiating the RRC re-establishment procedure by sending the RRC reestablishment request message to the network entity via the suitable relay.

5. The method of claim 4, further comprising:
    receiving an RRC reestablishment message from at least one of the suitable cell or the suitable relay; and
    sending an RRC reestablishment complete message to the suitable cell or the suitable relay.

6. The method of claim 1, wherein performing relay selection simultaneous with, before, or after cell selection comprises performing relay selection after cell selection and:
    initializing a timer when beginning the cell selection; and
    performing the relay selection to search for the suitable relay responsive to the timer expiring before the remote UE finds the suitable cell.

7. The method of claim 6, further comprising performing selection along with the relay selection responsive to the timer expiring before the remote UE finds the suitable cell.

8. The method of claim 1, wherein performing relay selection simultaneous with, before, or after cell selection comprises performing relay selection before cell selection and:
    initializing a timer when beginning the relay selection; and
    performing the cell selection to search for the suitable cell responsive to the timer expiring before the remote UE finds the suitable relay.

9. The method of claim 8, further comprising performing cell selection along with the relay selection responsive to the timer expiring before the remote UE finds the suitable relay.

10. The method of claim 1, wherein the remote UE utilizes an exceptional pool of resources after detection of the RLF and before RRC reestablishment.

11. The method of claim 10, wherein:
    the remote UE utilizes an exceptional pool provided by a cell in which the RLF was detected while performing the relay selection or the cell selection; and
    the remote UE utilizes an exceptional pool provided by a cell in which it initiates re-establishment after finding the suitable cell or the suitable relay.

12. The method of claim 1, further comprising receiving signaling configuring the remote UE to, when attempting to reestablish RRC connection:
    perform the cell selection and the relay selection simultaneously;
    perform the relay selection before performing the cell selection; or
    perform the relay selection after performing the cell selection.

13. The method of claim 1, further comprising, after the remote UE has reestablished RRC connection with the first network entity or a second network entity, sending a report indicating the RLF.

14. The method of claim 13, wherein the remote UE sends the report via a UE information response message.

15. The method of claim 13, further comprising providing an indication of availability of the report via an RRC setup complete message or RRC reestablishment complete message.

16. The method of claim 13, wherein the report is sent directly to a network entity or via a relay UE.

17. The method of claim 13, wherein the report indicates at least one of: an RLF cause, an identification of the remote UE, measurements on the first link, or measurements associated with the first link, or measurements associated with the second link.

18. A method for wireless communications by a network entity, comprising:
sending a report indicating a radio link failure (RLF), the report indicating to a remote user equipment (UE) to, when attempting to reestablish RRC connection, perform relay selection to search for a suitable relay simultaneous with, before, or after cell selection to search for a suitable cell;
receiving, from the remote UE, a radio resource control (RRC) reestablishment request message;
determining if the remote UE was previously connected to the network entity or another network entity via a first relay UE;
retrieving a context of the remote UE from the other network entity if the remote UE was previously connected to the other network entity; and
transmitting an RRC reestablishment message or RRC setup message to the remote UE.

19. The method of claim 18, wherein:
the determination is the remote UE was previously connected to the network entity via the first relay UE; and
the RRC reestablishment request message is received from the remote UE via a second relay UE.

20. The method of claim 19, further comprising:
receiving an RRC reestablishment complete message from the remote UE, via a same route used by the network entity to send the RRC reestablishment message.

21. The method of claim 20, further comprising, upon receipt of the RRC reestablishment compete message:
reconfiguring a radio link control (RLC) and adaptation layer for the remote UE and the second relay UE; and
signaling the first relay to release an adaptation layer configuration related to the remote UE.

22. The method of claim 18, wherein:
the determination is the remote UE was previously connected to the other network entity via the first relay UE.

23. The method of claim 22, further comprising:
retrieving a context of the remote UE from the other network entity.

24. The method of claim 23, further comprising:
receiving an RRC reestablishment complete message from the remote UE; and
signaling the other network entity to release a context of the remote UE.

25. The method of claim 18, wherein:
the determination is the remote UE was previously connected to the other network entity via a first relay UE; and
the RRC reestablishment request message is received directly from the remote UE.

26. The method of claim 18, further comprising:
retrieving a context of the remote UE from the other network entity.

27. The method of claim 25, further comprising:
receiving an RRC reestablishment complete message from the remote UE; and
signaling the other network entity to release a context of the remote UE.

28. The method of claim 18, wherein:
the determination is the remote UE was previously connected to the other network entity via a first relay UE; and
the RRC reestablishment request message is received from the remote UE via a second relay UE.

29. The method of claim 28, further comprising:
retrieving a context of the remote UE from the other network entity.

30. The method of claim 25, further comprising:
receiving an RRC reestablishment complete message from the remote UE via the second relay; and
signaling the other network entity to release a context of the remote UE.

31. The method of claim 18, further comprising, providing the remote UE an exceptional pool of resources, wherein the remote UE utilizes the exceptional pool of resources provided by the network entity at least for signaling the RRC reestablishment request message.

32. The method of claim 18, wherein the network entity receives the report via a UE information response message.

33. The method of claim 18, further comprising determining availability of the report via an RRC setup complete message or RRC reestablishment complete message.

34. The method of claim 18, wherein the report is sent directly to the network entity or via a relay UE.

35. The method of claim 18, wherein the report indicates at least one of: an RLF cause, an identification of the remote UE, measurements on the first link, or measurements associated with the first link, or measurements associated with the second link.

36. An apparatus for wireless communications by a remote user equipment (UE), comprising:
at least one processor and a memory configured to
detect, on at least one of a first link between a first relay UE and a first network entity or a second link between the remote UE and the first relay UE, a radio link failure (RLF) resulting in a loss of radio resource control (RRC) connection;
attempt to reestablish RRC connection by performing relay selection to search for a suitable relay simultaneous with, before, or after cell selection to search for a suitable cell; and
initiate an RRC re-establishment procedure by sending an RRC reestablishment request message directly to a network entity of the suitable cell or initiating the RRC re-establishment procedure by sending the RRC reestablishment request message to a network entity via the suitable relay.

37. The apparatus of claim 36, wherein the at least one processor and the memory configured to perform relay selection to search for the suitable relay simultaneous with, before, or after cell selection to search for the suitable cell comprises the at least one processor and the memory configured to perform one of the relay selection or the cell selection and further comprising the at least one process and the memory configured to:

initialize a timer when beginning the one of the relay selection or the cell selection;

perform an other of the relay selection or the cell selection responsive to the timer expiring before the one of the relay selection or the cell selection results in finding a suitable relay or suitable cell.

38. The apparatus of claim 36, wherein the at least one processor and the memory configured to perform relay selection to search for the suitable relay simultaneous with, before, or after cell selection to search for the suitable cell comprises the at least one processor and the memory configured to perform the relay selection simultaneous with the cell selection and further comprising the at least one process and the memory configured to:

responsive to finding the suitable cell before finding the suitable relay, initiate the RRC re-establishment procedure by sending the RRC reestablishment request message directly to the network entity of the suitable cell; or responsive to finding the suitable relay before finding the suitable cell, initiating the RRC re-establishment procedure by sending the RRC reestablishment request message to the network entity via the suitable relay.

39. An apparatus for wireless communications by a network entity, comprising:

at least one processor and a memory configured to send a report indicating a radio link failure (RLF), the report indicating to a remote user equipment (UE) to, when attempting to reestablish RRC connection, perform relay selection to search for a suitable relay simultaneous with, before, or after cell selection to search for a suitable cell; and receive, from the remote UE, a radio resource control (RRC) reestablishment request message;

determine if the remote UE was previously connected to the network entity or another network entity via a first relay UE;

retrieve a context of the remote UE from the other network entity if the remote UE was previously connected to the other network entity; and transmit an RRC reestablishment message or RRC setup message to the remote UE.

40. The apparatus of claim 39, the at least one processor and the memory configured to send a report indicating the RLF providing the remote UE an exceptional pool of resources, wherein the remote UE utilizes the exceptional pool of resources provided by the network entity at least for signaling the RRC reestablishment request message.

* * * * *